Patented May 22, 1934

1,959,375

UNITED STATES PATENT OFFICE 1,959,375

METHOD OF MAKING A SUBSTITUTE FOR WOOD

Emil C. Loetscher, Dubuque, Iowa

No Drawing. Application June 22, 1931, Serial No. 546,173

9 Claims. (Cl. 18—55)

The ultimate object of this invention is the production of rigid molded products from disintegrated cellulosic material bound into a homogeneous body by a synthetic resin binder reacted in the presence of heat and pressure.

An important object of the invention is to reduce to a minimum the quantity of introduced binder essential to the production of a rigid homogeneous product, thereby greatly reducing the cost of production.

A further object is to utilize, in connection with the introduced binder, the natural binders secreted in the cellulosic material under treatment.

In attempting to produce artificial lumber or molded products from sawdust, shavings, chips, straw and other compressible disintegrated particles of cellulosic material by employing a synthetic resin binder, it has been found that, because of the high cost of the synthetic resin, an inexpensive product could not be produced under ordinary methods. As the result of considerable thought and experimentation, it has been found that an extremely small quantity of synthetic resin will suffice to bind such particles into a rigid and inexpensive structure when applied in accordance with this invention.

The ingredients used and the procedure followed in the preparation of one product of this invention are as follows:

*Formula #1.*—A molding mix is prepared by pouring 5% of synthetic resin in solution form onto 5% of finely disintegrated fibrous material preferably wood flour. This molding mix (total 10%) is then dried in an oven and pulverized, preferably to an impalpable powder. An aggregate, total 90% and consisting of white pine sawdust and a small quantity of shavings, is then placed within a tumbling mill and the molding mix then added and the whole mass 200 grams tumbled until the particles of sawdust and shavings are dusted with particles of the molding mix. The mass of sawdust and shavings, with the individual particles thereof having small particles of the molding mix adhering thereto in the form of separate minute specks, is then placed between heated platens of a hydraulic press and subjected to pressure during which the synthetic resin in the particles of the molding mix becomes fused and then reacted into an insoluble and infusible substance, binding the mass into a rigid homogeneous compressed structure. When subjected to hydrostatic pressure of 1,000 pounds, and 100 pounds of steam (representing 340° F. of heat), for a period of ten minutes, the product comes out of the press and a sample 6 x 6 inches shows a thickness of .275 inch and density of .044 per cubic inch. This sample cannot be broken across one's knee and a two inch test strip therefrom on supports five inches apart has a modulus of rupture of 3,700 pounds per square inch. Under prolonged humidity test, this specimen will show expansion of .006 inch, or 2.18 per cent.

Various products, such as lumber, panels, and molded shapes when made in accordance with the foregoing example, will be found to be excellent substitutes for similar natural wood products and may be marketed at competitive prices therewith.

Still cheaper products, not requiring the strength, finish, or moisture-proof qualities of the foregoing may be produced by following the same procedure as above, but by reducing the percentage of synthetic resin binder employed and correspondingly reducing the percentage of wood flour used therewith in the molding mix. In all cases, the synthetic resin binder and wood flour are preferably used in equal parts in making up the molding mix, but obviously there may be a permissible deviation from these exact proportions. A cheaper product may be produced as follows:—

*Formula #2.*—A molding mix is prepared as in Formula #1, except that only 2½% synthetic resin and 2½% wood flour are used to make the molding mix, and after drying and pulverization, this molding mix is introduced into the tumbling mill with 95% white pine sawdust and shavings aggregate, and temperature for the same length of time as in Formula #1. This specimen (200 gram sample) will show a thickness of .28 inch, and a density of .0394 per cubic inch. Humidity tests show expansion of .027 inch, or about 10%.

More expensive products may be produced by increasing the percentage of synthetic resin binder, correspondingly increasing the wood flour to make a richer molding mix, but attention is directed to the fact that there is a point beyond which one cannot go in increasing the percentage of synthetic resin binder without increasing the cost of production beyond where the artificial product may be sold at a competitive price with the natural product and this point is one considerably below that at which the particles of sawdust and shavings become entirely covered or coated with the synthetic resin. Applicant specifically avoids complete coating or covering of the sawdust and other particles of the aggregate with synthetic resin since the same would produce no spots of synthetic resin into the spaces between which the liberated natural resins may flow to serve as a cheap augmenting bond between the sawdust and other particles additional to the bonding spots of relatively expensive synthetic resin. Not only is complete enshroudment of the sawdust and like particles of the aggregate avoided as a matter of excessive expense as well as to permit the bonding action of the natural resins to be taken advantage of, but also because such an amount of synthetic resin would make it too difficult, if not entirely impossible, to work the product with ordinary carpenter's tools or the product to freely take nails. The critical amount of synthetic resin that may be used to obtain these desideratums cannot be exactly determined, because it varies with the amount of reacting pressure used, but applicant in his experiments with all percentages of synthetic resin up to the point of complete enshroudment of the sawdust and like particles has found that percentages under 15% have produced artificial lumber having characteristics most closely approaching those of natural wood. There is nothing, however, to prevent the invention being practised even in the production of quite expensive products, but in the main the value of the invention lies in the cheapness of the products that may be prepared by following the steps of this invention. The greater the percentage of synthetic resin binder, the greater the strength of the article produced and the greater its density, water-proof qualities and the finer its finish, but the more difficult to work with tools and the more difficult to penetrate with nails.

In addition to the particular method employed of applying the binder, another important factor in reducing the cost of production to a point where the product can be sold in competition with natural and most artificial products and at even a less price as in the case of lumber ⅞" thick and under, is the fact that a cheap though highly efficient synthetic resin binder which may be designated as a water soluble phenol-formaldehyde-carbon-hydrate resin is employed. It has the property of becoming plastic at slight application of heat and pressure and upon further application of heat and pressure of solidfying, into an infusible and insoluble state, very similar to bakelite. Other binders, such as bakelite may be used, but this condensation product, like most, if not all others, makes the ultimate product too expensive for commercial exploitation.

While in both of the formulas given, the synthetic resin binder was incorporated with an equal quantity of wood flour to make up a molding mix which was then reduced to powder and in that condition applied to the aggregate in the manner recited, the invention, nevertheless, contemplates the production of articles by simply dusting the particles of the aggregate with powdered synthetic resin binder alone. Satisfactory results have thus been obtained, but not comparable with those obtained when synthetic resin binder is mixed with substantially an equal quantity of wood flour to make a molding mix that is pulverized and then dusted upon the particles of the aggregate. The following formula will give a definite idea of how the two methods of introducing the synthetic resin binder compare:

Formula #3.—A white pine aggregate of sawdust and shavings, totalling 95% is placed in a tumbling mill with 5% synthetic resin binder in pulverized form and tumbled until the particles of aggregate are thoroughly dusted. The mass is then placed in the press and subjected to the same pressure and temperature for the same length of time as in the other formulas. This specimen 200 gr. sample shows a thickness of .287 inch, and a density of .043 per cubic inch. Its modulus of rupture is 2,030 pounds pressure per square inch, and under humidity tests shows expansion of approximately 15%.

Comparing the product of Formula #1 with that of Formula #3, it is observed that the former shows substantially 80% greater strength, which establishes the fact that there is some marked strength imparting property in introducing the synthetic resin binder in conjunction with wood flour in a molding mix rather than alone. This may be attributed to the fact that the synthetic resin when incorporated with wood flour in a molding mix produces after reaction of fibrous resin-saturated bond between the particles of aggregate that greatly exceeds the pure resinous bond in strength. Humidity tests show that the product of Formula #1 shows less re-expansion than the product of Formula #3, which establishes that the moisture-resisting qualities of the product are also improved by introducing the synthetic resin binder in a molding mix rather than alone.

While wood flour is preferably employed with the synthetic resin binder to form the molding mix, in certain cases other fibrous material may replace the wood flour, such as pulverized corn stalk, or any other fibrous material capable of being pulverized into or nearly into an impalpable powder.

Cellulosic material contains certain natural binders, and these are utilized by this invention to augment the binding action of the introduced synthetic resin binder. When the dusted aggregate is compressed, the particles thereof are brought into intimate contact and are flattened and reduced in bulk. The particles of introduced resin under the effect of the applied heat soften and film out and, upon becoming reacted into an infusible and insoluble state, rigidly unite the adjacent particles of the aggregate. The particles of introduced resin on the particles of aggregate next to the platens likewise film out or flow to form an infusible and insoluble surface crust upon the product which fortifies the surface particles of the aggregate from absorbing moisture. When heat has penetrated the mass of aggregate, the natural binders which include natural resins fuse and are forced to the surfaces of the particles of aggregate, filling the voids between such particles and filling in between and surrounding the specks of introduced synthetic resin. Adjacent the platens, the synthetic resin particles film out to form the surface crust before the natural resins become affected by the applied heat. When a yellow pine aggregate is employed, an abundance of natural resin therein may cause the same to show on the surface of the product and this is explained by the fact that the introduced synthetic resin may be employed in such small quantity as to leave pores in the surface crust or else the volume of natural resins present may be so great that they forcibly push their way through the synthetic resin surface crust before the latter resin has become fully reacted. Stress is placed upon the fact that regardless of the reasons for the natural resins showing on the surface of the product, they may be readily wiped off with a suitable solvent leaving the surface smooth and receptive of any ordinary finish coating and filling in the pores or ruptures in the insoluble and infusible synthetic resin surface crust against entry of moisture.

The recited formulas all employ a white pine aggregate, and while the same formulas may be followed with corn stalk fibres or other cellulosic aggregates containing a greater or lesser natural resin factor, the invention contemplates varying the amount of introduced synthetic resin binder according to the amount of natural resins contained in the aggregate. Yellow pine aggregate, rich in natural resins, particularly rosin, does not require the same amount of introduced synthetic resin binder as white pine, but the synthetic resin must not be reduced beyond the point where the product loses its rigidity and other superior properties, since the natural resins remain more or less gummy and do not react with heat as the synthetic resins do to form a hard insoluble and infusible substance. The natural resins in the aggregate are not looked to for these latter qualities, and while they produce a very effective binding action on their own account, (though not as effective as that of the synthetic resin), they also perform the equally important purpose of filling in the voids between the particles of aggregate as well as the gaps left between the specks of filmed out introduced synthetic resin binder.

Reverting to Formula #1, when one considers the great surface area of 90% aggregate, it would seem impossible that so small an amount of introduced synthetic resin binder as 5% could be so thoroughly disseminated throughout the mass of aggregate as to cause such perfect uniting of the particles thereof into a rigid, homogeneous, moisture resisting product showing so satisfactory a test; or that this amount of binder could be reduced to so low a percentage as 2½%. Such complete dissemination of the binder could not be produced by any ordinary method of mixing, as stirring, and while tumbling answers the purpose perfectly, the right is reserved of applying the synthetic resin binder or molding mix containing the same by other means or method so long as the particles of aggregate receive an application of minute specks of synthetic resin or molding mix containing the same. It is important that the particles of binder, however introduced, should be evenly dispersed throughout the mass of aggregate and that when the aggregate enters the press with its clinging particles of binder or molding mix that there should be no material accumulations of unattached binder within the mass of aggregate, since such accumulations, when reacted, will produce dark spots in the surface of the product.

By increasing the amount of introduced synthetic resin binder, the specks thereof or of molding mix containing the same, are placed closer together and the voids between them are smaller so that less natural resin is required, when depended upon, to be present in the aggregate to fill the voids.

Another important phase of the invention is the effect of pressure. A specimen containing only 2½% or other low percentages of synthetic resin binder with an equal quantity of wood flour and introduced into the aggregate by tumbling and subjected to the same heat as in the other examples but to only 500 pounds pressure, disintegrated when placed in water. At this same pressure, the percentage of synthetic resin binder if increased sufficiently would produce a product that would not disintegrate in water, but would increase the cost of production. Applicant has found that by increasing the pressure, to substantially 1,000 pounds, the same proportion of ingredients that disintegrated in water when subjected to 500 pounds pressure showed a commercially satisfactory humidity test when subjected to substantially 1,000 pounds pressure.

All attempts to mix low percentages of synthetic resin binder into the aggregate by methods that do not cause complete dispersion of the particles of binder throughout the mass of aggregate, in the form of separate minute specks of binder attached to the particles of aggregate, have proven insufficient. In an experiment employing the same ingredients and proportions thereof as were used in Formula #1, namely 5% synthetic resin, 5% wood flour, and 90% aggregate of white pine sawdust and shavings, the synthetic resin in liquid state was mixed with the aggregate and wood flour all in bulk and the whole mass subjected to the same pressure and heat as in Formula #1, and the product was found to be worthless due to the fact that this method of introducing the synthetic resin binder failed to produce the necessary uniform dissemination thereof throughout the mass of aggregate for the bonding of the particles of the latter together. A specimen 6 x 6 inches, 200 grams, showed thickness of .404 inch, and density .032 per cubic inch. This sample completely fell apart under humidity test, showing that the synthetic resin binder was not uniformly distributed throughout the mass of aggregate, causing the product to have no strength or water resistance.

The shavings referred to herein are those commonly produced by a planing machine and are mostly in the nature of chips, yet the term may equally apply to broken shavings such as are produced by hand planes.

I claim:

1. The method of making a substitute for wood from a mass of particles of disintegrated wood made up mostly of sawdust, consisting in substantially uniformly distributing a quantity of pulverized synthetic resin throughout the said mass by dusting the same upon virtually all the individual particles thereof, the quantity of synthetic resin being sufficient to cause said individual particles of disintegrated wood to receive in the main only a spotted application of one or more grains of the pulverized synthetic resin, and compressing the treated mass and reacting the synthetic resin.

2. The method of making a substitute for wood from a mass of particles of disintegrated wood made up entirely or mostly of sawdust, consisting in substantially uniformly dry mixing a quantity of impalpably pulverized synthetic resin throughout the mass until virtually all of the wood particles have received a spotted but not an enveloping application of pulverized synthetic resin, and compressing the treated mass and reacting the synthetic resin.

3. The method of making a substitute for wood from a mass of particles of disintegrated natural resin containing wood and said mass being made up entirely or mostly of sawdust, consisting in dry agitating the same in a tumbling mill with a predetermined amount of pulverized synthetic resin until the latter is uniformly distributed throughout the mass and material accumulations of synthetic resin avoided, the amount of synthetic resin being sufficient to unite adjacent wood particles in the finished product mostly at spaced intervals only, and compressing the treated mass in the presence of heat sufficient to react the synthetic resin and to cause the natural resins of the wood to flow into the spaces between the said wood particles and the synthetic resin bonds.

4. The method of making a substitute for wood from a mass of particles of disintegrated wood consisting in dry mixing the same with 5% or less of synthetic resin reduced substantially to an impalpable powder and continuing mixing until the synthetic resin is uniformly distributed throughout the mass and material accumulations of synthetic resin avoided, and compressing the treated mass and reacting the synthetic resin.

5. The method of making a substitute for wood from a mass of disintegrated wood the bulk of which is sawdust, consisting in treating finely divided wood with synthetic resin and then finely pulverizing the mixture, uniformly dry mixing the mass of disintegrated wood with 5% or less but not more of the pulverized mixture of synthetic resin and finely divided wood, and compressing the treated mass and reacting the synthetic resin.

6. The method of making a substitute for wood from a mass of particles of disintegrated natural resin containing wood, consisting in dry mixing the same with a predetermined amount of pulverized synthetic resin until the latter is uniformly distributed throughout the mass without material accumulations of synthetic resin, the amount of synthetic resin being sufficient to unite adjacent wood particles in the finished product mostly at intervals only and to leave considerable ununited facial portions between said adjacent wood particles intermediate the synthetic resin bonds to be filled by natural resins flowing from the wood particles, and compressing the treated mass in the presence of heat, sufficient to react the synthetic resin and to cause the natural resins of the wood to flow as aforesaid.

7. The method of making a substitute for wood from a mass of particles of wood sawdust and the like, consisting of mixing the same with 5% or less but not more of synthetic resin, dispersing the synthetic resin uniformly throughout the mass and depositing the same in the main as separated particles upon the wood particles so that when such synthetic resin particles are reacted they will provide separated resinous bonds between the surfaces of adjacent wood particles, and compressing the treated mass and reacting the synthetic resin.

8. The method of making a substitute for wood from a mass of particles of wood sawdust and the like, containing natural resin, consisting in mixing the same with 5% or less but not more of synthetic resin, dispersing the synthetic resin uniformly throughout the mass and depositing the same in the main as separated particles upon the wood particles so that when such synthetic resin particles are reacted they will provide separated resinous bonds between the surfaces of adjacent wood particles, and compressing the treated mass with heat sufficient to react the synthetic resin and cause the natural resin of the wood to flow between the said resinous bond and wood particles.

9. The method of making a substitute for wood from a mass of disintegrated natural-resin-containing wood mostly in the form of sawdust, consisting in treating finely divided wood with synthetic resin and then pulverizing the mixture to an impalpable powder, applying one or more grains but not an enveloping quantity of the synthetic resin-wood mixture to virtually all of the particles of the said mass avoiding accumulations of the said mixture, and compressing the treated mass and reacting the synthetic resin and causing the natural resins of the disintegrated wood to flow between the grains of synthetic resin-wood mixture to augment the bonding action thereof.

EMIL C. LOETSCHER.